(12) United States Patent
Emrich et al.

(10) Patent No.: US 10,443,991 B2
(45) Date of Patent: Oct. 15, 2019

(54) SYSTEMS AND METHODS FOR LOCATING ARROWS

(71) Applicant: Breadcrumb, LLC, Naperville, IL (US)

(72) Inventors: Bryan Emrich, Naperville, IL (US); Daniel Jabre Daoura, Renton, WA (US); Nicholas Ryan Pearson-Franks, Sammamish, WA (US)

(73) Assignee: BREADCRUMB, LLC, Naperville, IL (US)

(*) Notice: Subject to any disclaimer, the term of this patent is extended or adjusted under 35 U.S.C. 154(b) by 0 days.

(21) Appl. No.: 15/451,172

(22) Filed: Mar. 6, 2017

(65) Prior Publication Data
US 2017/0261295 A1 Sep. 14, 2017

Related U.S. Application Data

(60) Provisional application No. 62/305,418, filed on Mar. 8, 2016.

(51) Int. Cl.
G06Q 50/06 (2012.01)
H04W 64/00 (2009.01)
(Continued)

(52) U.S. Cl.
CPC ........ F42B 12/385 (2013.01); A63B 24/0021 (2013.01); F42B 6/06 (2013.01);
(Continued)

(58) Field of Classification Search
CPC ........ A63B 2024/0053; A63B 2102/32; A63B 2220/12; A63B 2220/13; A63B 2220/14; A63B 2225/15; A63B 2225/50; A63B 2225/54; A63B 24/0021; A63B 43/00; F42B 12/385; F42B 6/06; G01S 19/19; G01S 19/51; G01S 5/02; G01S 5/06; G01S 5/14; G01S 5/0226; G06K 7/10108; G06K 7/10118; G06K 2017/0051; G06K 19/0716; G06K 7/10306; G06Q 10/08; G06Q 10/087; G08B 7/00; G08B 7/06; A47K 5/1217; A61J 1/035; A61J 2200/30; A61J 7/04; A61J 7/0436; A61J 7/0454; A61J 7/0472; A61J 7/0481; A61J 7/049; G05B 13/02; G05F 1/66; H03K 17/941; H03K 17/945; H03K 2217/0036; H04W 4/026; H04W 4/027; H04W 4/80;
(Continued)

(56) References Cited

U.S. PATENT DOCUMENTS 5,689,238 A * 11/1997 Cannon, Jr. ............ G06K 17/00 340/10.31
6,612,947 B2 9/2003 Porter
(Continued)

Primary Examiner — Dionne Pendleton
(74) Attorney, Agent, or Firm — Barnes & Thornburg LLP

(57) ABSTRACT

In one aspect, an example system includes an arrow nock configured to couple to an arrow, a transmitter coupled to the arrow nock, and a controller. The controller is configured to (i) determine that the arrow has been shot from a bow and (ii) responsive to determining that the arrow has been shot from the bow, cause the transmitter to transmit a beacon signal at a variable rate that varies based on an amount of time elapsed since determining that the arrow has been shot from the bow.

19 Claims, 6 Drawing Sheets

(51) Int. Cl.
    *A63B 69/36*     (2006.01)
    *F42B 12/38*     (2006.01)
    *G01S 19/51*     (2010.01)
    *G01S 19/19*     (2010.01)
    *A63B 24/00*     (2006.01)
    *F42B 6/06*     (2006.01)
    *G08B 7/00*     (2006.01)

(52) U.S. Cl.
    CPC .............. *G01S 19/19* (2013.01); *G01S 19/51* (2013.01); *G08B 7/00* (2013.01); *A63B 2024/0053* (2013.01); *A63B 2220/12* (2013.01); *A63B 2220/13* (2013.01); *A63B 2220/14* (2013.01); *A63B 2225/50* (2013.01); *A63B 2225/54* (2013.01)

(58) Field of Classification Search
    CPC .......... H04W 52/0251; H04W 52/0261; Y02D 70/1262; Y02D 70/1264; Y02D 70/23; Y02D 70/26; Y02D 137/86389; Y02D 70/00; Y10T 137/86389
    See application file for complete search history.

(56) References Cited

U.S. PATENT DOCUMENTS

| | | | |
|---|---|---|---|
| 6,764,420 B2 | 7/2004 | Cyr et al. | |
| 6,814,678 B2 | 11/2004 | Cyr et al. | |
| 6,856,250 B2 | 2/2005 | Hilliard | |
| 7,300,367 B1 | 11/2007 | Andol et al. | |
| 7,331,887 B1 | 2/2008 | Dunn | |
| 7,632,199 B2 | 12/2009 | Kikos | |
| 7,837,580 B2 | 11/2010 | Huang et al. | |
| 7,927,240 B2 | 4/2011 | Lynch | |
| 7,931,550 B2 | 4/2011 | Lynch | |
| 7,972,230 B2 | 7/2011 | Donahoe | |
| 7,993,224 B2 | 8/2011 | Brywig | |
| 8,075,430 B1 | 12/2011 | Hester | |
| 8,128,520 B2 | 3/2012 | Miner | |
| 8,221,273 B2 | 7/2012 | Donahoe | |
| 8,282,517 B2 | 10/2012 | Donahoe | |
| 8,323,132 B2 | 12/2012 | Kirsch | |
| 8,446,319 B2 | 5/2013 | Parker et al. | |
| 8,529,383 B2 | 9/2013 | Donahoe | |
| 8,585,517 B2 | 11/2013 | Donahoe | |
| 8,777,786 B1 | 7/2014 | Bay | |
| 8,797,176 B1* | 8/2014 | Baldwin | G08B 7/06 340/388.4 |
| 8,821,325 B2 | 9/2014 | Kirsch | |
| 8,952,808 B2 | 2/2015 | Steinman et al. | |
| 9,030,296 B2 | 5/2015 | Steinman et al. | |
| 9,075,124 B2 | 7/2015 | Zusman et al. | |
| 9,141,215 B2 | 9/2015 | Donahoe | |
| 9,239,215 B2 | 1/2016 | Donahoe | |
| 9,279,649 B2 | 3/2016 | Bay | |
| 9,904,885 B2* | 2/2018 | Sengstaken, Jr. | G06K 19/0716 |
| 2008/0207357 A1* | 8/2008 | Savarese | A63B 24/0021 473/407 |
| 2010/0035709 A1 | 2/2010 | Russell et al. | |
| 2011/0306447 A1 | 12/2011 | McFatridge | |
| 2012/0196708 A1 | 8/2012 | Maddox | |
| 2012/0262290 A1 | 10/2012 | Miner | |
| 2014/0266706 A1 | 9/2014 | DiSanto | |
| 2014/0371011 A1 | 12/2014 | Kirsch | |
| 2015/0176953 A1 | 6/2015 | Meier et al. | |
| 2016/0072611 A1* | 3/2016 | Horne | G06K 19/07336 455/1 |
| 2017/0161530 A1* | 6/2017 | Turner | G06K 7/10306 |
| 2017/0308727 A1* | 10/2017 | Lombardi | G06Q 10/08 |
| 2017/0357835 A1* | 12/2017 | Oono | G09B 19/0092 |
| 2019/0132815 A1* | 5/2019 | Zampini, II | H04W 64/003 |

\* cited by examiner

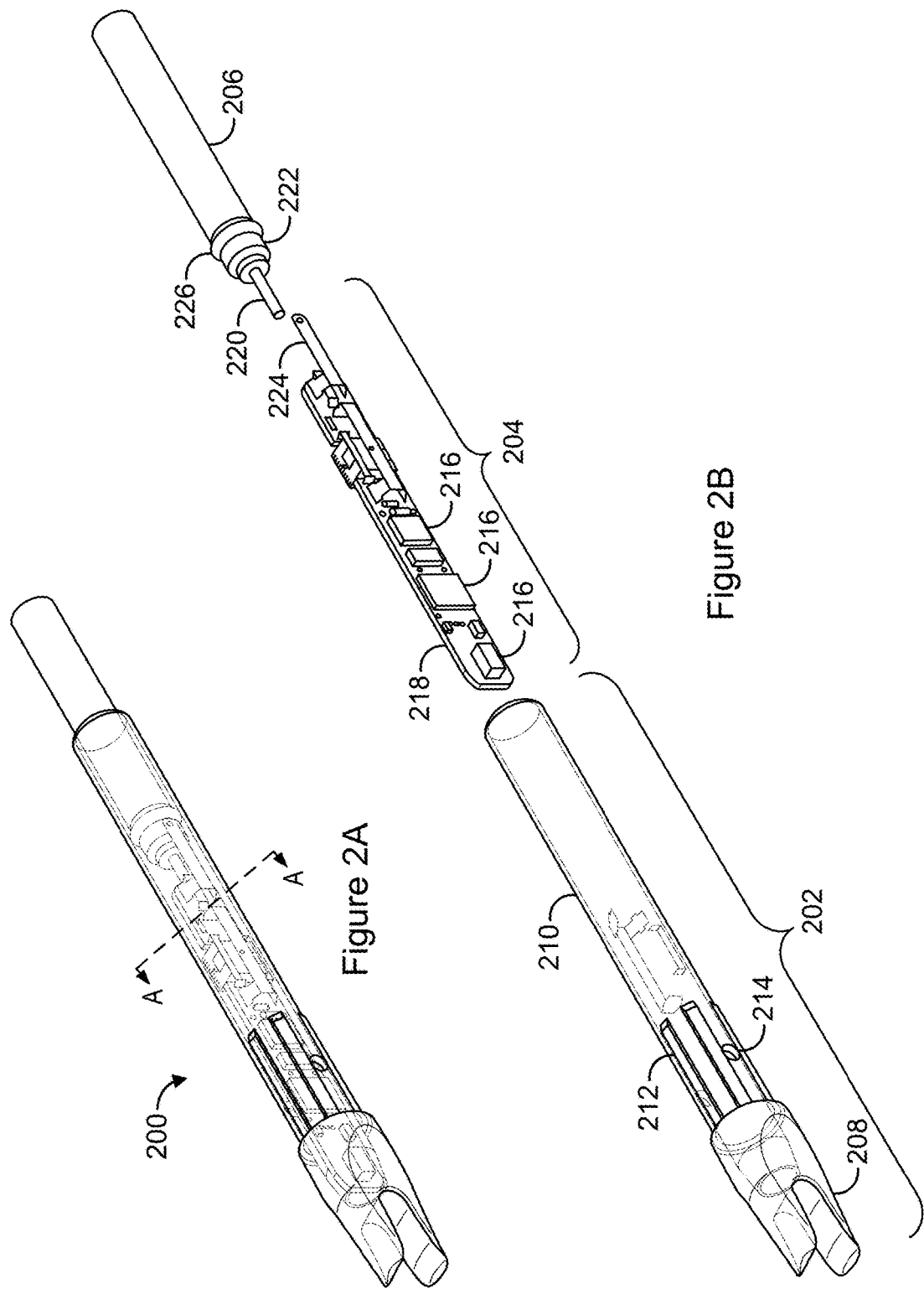

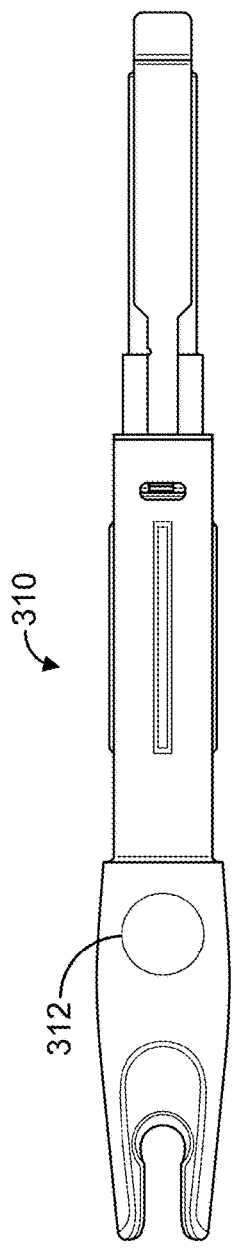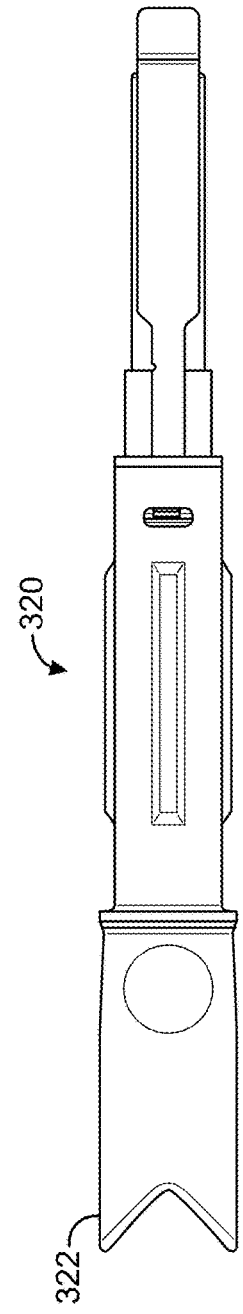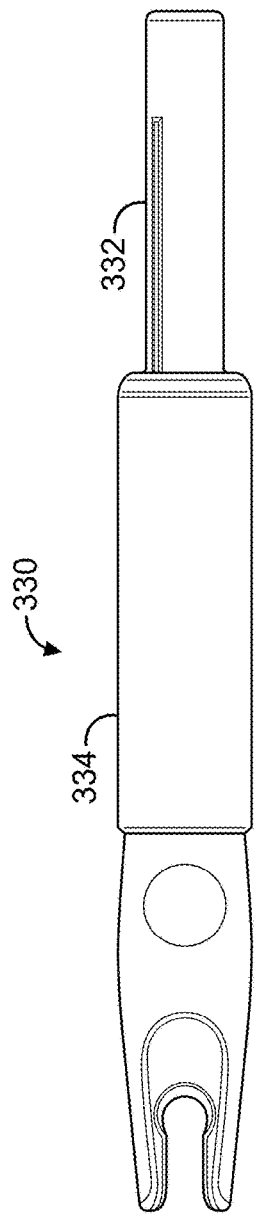

US 10,443,991 B2

SYSTEMS AND METHODS FOR LOCATING ARROWS

RELATED DISCLOSURE

This disclosure claims priority to U.S. Provisional Patent Application No. 62/305,418, titled "Systems and Methods for Locating Arrows," filed on Mar. 8, 2016, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means at least one.

SUMMARY

In one aspect, an example method is disclosed. The method includes (i) determining, by a computing system, that an arrow has been shot from a bow, wherein the arrow comprises a transmitter; and (ii) responsive to determining that the arrow has been shot from the bow, causing, by the computing system, the transmitter to transmit a beacon signal at a variable rate that varies based on an amount of time elapsed since determining that the arrow has been shot from the bow.

In another aspect, an example system for use in connection with an arrow is disclosed. The system includes an arrow nock configured to couple to the arrow, a transmitter coupled to the arrow nock, and a controller configured to (i) determine that the arrow has been shot from a bow and (ii) responsive to determining that the arrow has been shot from the bow, cause the transmitter to transmit a beacon signal at a variable rate that varies based on an amount of time elapsed since determining that the arrow has been shot from the bow.

In another aspect, another example system for use in connection with an arrow is disclosed. The system includes an arrow nock configured to couple to the arrow, a transmitter coupled to the arrow nock, and a controller configured to (i) determine that the arrow has been shot from a bow and (ii) responsive to determining that the arrow has been shot from the bow, cause the transmitter to transmit a beacon signal at a variable rate, wherein the variable rate is a first rate at a first time, wherein the variable rate is a second rate at a second time, and wherein the second rate is less than the first rate and the second time is later than the first time.

BRIEF DESCRIPTION OF THE DRAWINGS

FIG. 2A is a perspective view illustration of an example arrow nock system.

FIG. 2B is an exploded view illustration of the example arrow nock system shown in FIG. 2A, the cross section being taken along the line A-A of FIG. 2A.

FIG. 3A is a top view illustration of another example arrow nock system.

FIG. 3B is a top view illustration of another example arrow nock system.

FIG. 3C is a top view illustration of another example arrow nock system.

DETAILED DESCRIPTION

I. Overview

Figure 1:
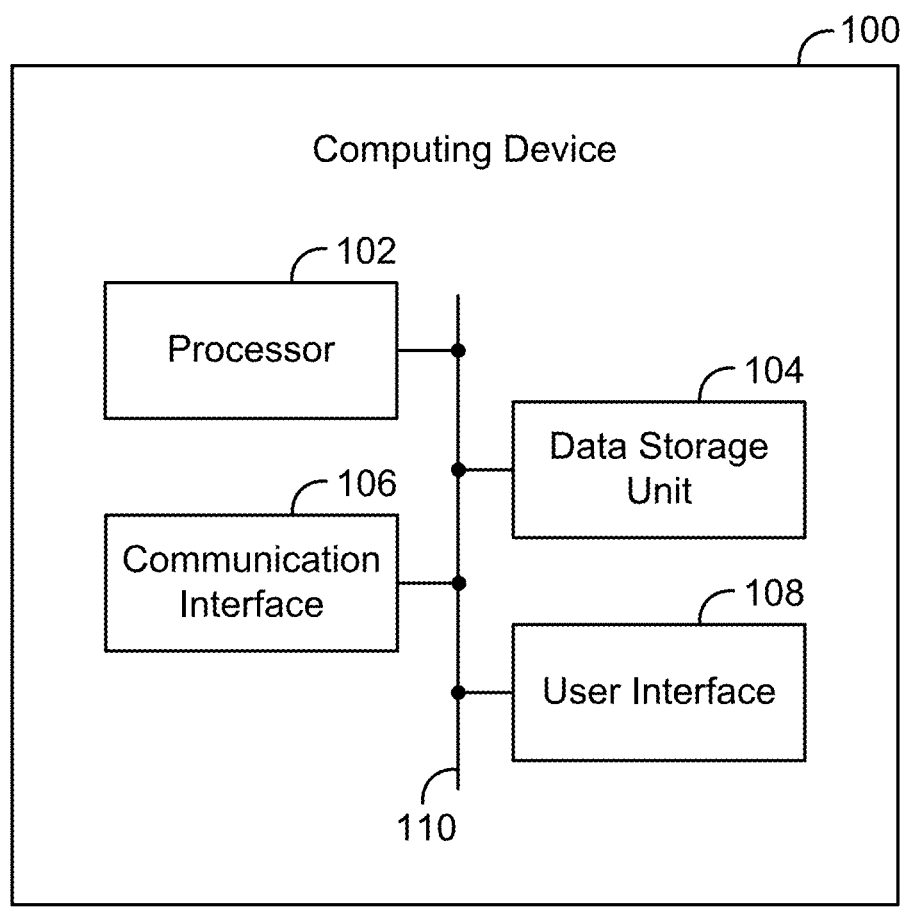
FIG. 1 is a simplified block diagram of an example computing device.

An arrow can be outfitted with various components that can help allow the arrow to be located after being shot from a bow. In this disclosure, the term "arrow" means any type of arrow or bolt configured for use with a bow or a crossbow, and the term "bow" means any type of bow or crossbow configured for shooting an arrow or bolt. In practice, an arrow can include a transmitter (e.g., a Bluetooth transmitter), a light source (e.g., a light-emitting diode (LED)), a sound-emitting device (e.g., a buzzer), an accelerometer and/or a shock sensor, a battery, a trigger mechanism (e.g., a switch or button), and/or a controller, all of which can be located in, on, or near a nock of the arrow. In another example, the light source can be disposed in, on, or near the nock, and the remaining components can be disposed in, on, or near a remote portion of the arrow.

The controller can determine that the arrow has been shot from a bow (e.g., based on a signal output by the accelerometer or shock sensor), and the controller can then operate the transmitter, light source, and/or sound-emitting device to help allow the arrow to be located. The controller can operate the transmitter as a beacon, sending a locating signal that can be received by a remote device, such as a smartphone. The remote device can include location tracking software that can allow a user to track the location of the arrow based on the received locating signal. For instance, based on the received locating signal, the remote device can indicate a proximity of the remote device to the transmitter. Additionally, the controller can operate the light source and sound-emitting device to provide visual and/or audio cues that help the arrow stand out from its environment.

As noted above, the arrow can include a battery that can be used to power the transmitter, light source, sound-emitting device, and/or controller. However, batteries have a limited energy supply, such that the battery may only be capable of powering these components for a limited duration. Once the battery is drained of charge, the transmitter, light source, and/or sound-emitting device can cease operation, thereby making it more difficult to locate the arrow. Accordingly, it can be desirable to increase the time duration at which the battery can power the transmitter, light source, and/or sound-emitting device.

The present disclosure provides a system that helps address these issues. In one aspect, the controller can cause the transmitter to transmit the beacon signal at a particular rate based on how much time has elapsed after shooting the arrow from the bow. For example, shortly after the arrow is shot from the bow, the controller can cause the transmitter to transmit the beacon signal at an initial rate (e.g., once per second), and as the elapsed time increases, the controller can decrease the beacon signal transmission rate to a slower, subsequent rate (e.g., once every ten minutes). Similarly, the controller can use pulse width modulation (PWM) to pulse the light source and the sound-emitting device at a particular duty cycle based on how much time has elapsed after shooting the arrow from the bow. In particular, the controller can reduce the duty cycle of the light source and the sound-emitting device as the elapsed time after shooting the arrow increases.

Reducing the transmission rate of the beacon signal and reducing the duty cycles of the light source and the sound-emitting device can allow the battery to power these components for a longer period of time without running out of charge. And powering these components for a longer period of time can increase the likelihood of the arrow being located.

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions contained in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as from the communication interface 106 and/or the user interface 108. The data storage unit 104 can also store other types of data, such as those types described in this disclosure.

The communication interface 106 can allow the computing device 100 to connect with and/or communicate with another other entity according to one or more protocols. In one example, the communication interface 106 can be a wired interface, such as an Ethernet interface. In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

The computing device 100 can take various forms, such as a mobile phone, a tablet, a laptop, a desktop computer, or the like.

B. Arrow Nock System

FIG. 2A is an illustration of an example arrow nock system 200 for use in connection with an arrow, and FIG. 2B is an exploded view illustration of the example arrow nock system 200. The arrow nock system 200 can include a nock housing 202, a computing system 204, and a battery 206. In this disclosure, the term "computing system" means a system that includes at least one computing device. In some instances, a computing system can include one or more other computing systems.

The nock housing 202 can include a nock portion 208 and a shaft portion 210 coupled to the nock portion 208. The nock portion 208 can be shaped to engage a bow string for purposes of shooting an arrow. As shown, the nock portion 208 can be shaped to engage a bow string of a standard bow. However, in other examples, the nock portion 208 can be shaped to engage various other types of bow strings, such as a crossbow string.

The shaft portion 210 can have an outer diameter that is slightly smaller than an inner diameter of an arrow shaft, such that the shaft portion 210 can be inserted into the arrow shaft. Different types of arrows can have different inner diameters of their shaft, and so the outer diameter of the shaft portion 210 can vary across examples in order to fit within a given arrow shaft. Further, the shaft portion 210 can include one or more ribs 212 that protrude from the shaft portion 210, such that the ribs 212 can engage an inner surface of the arrow shaft, causing the shaft portion 210 to snugly fit within the arrow shaft.

As further shown, at the junction of the nock portion 208 and the shaft portion 210, the nock housing 202 can have a diameter that is larger than the diameter of the shaft portion 210. The diameter at this junction can be larger than the inner diameter of the arrow shaft such that the nock portion 208 of the nock housing 202 remains exposed from the arrow shaft when the shaft portion 210 is inserted into the arrow.

Further, the shaft portion 210 of the nock housing 202 can have a hollowed out interior cavity for receiving all or part of the computing system 204 and/or the battery 206, and the interior cavity can extend into the nock portion 208 such that at least some of the computing system 204 can be arranged within the nock portion 208.

The computing system 204 can include various electronic devices 216, some or all of which can be mounted in various ways on one or more surfaces of a substrate 218, such as a printed circuit board (PCB). The computing system 204 and or its substrate 218 can be secured within the nock housing 202 in various ways, such as by using various types of non-conductive adhesive. The adhesive can be applied via an aperture 214 in the shaft portion 210 of the nock housing 202.

Figure 2C:
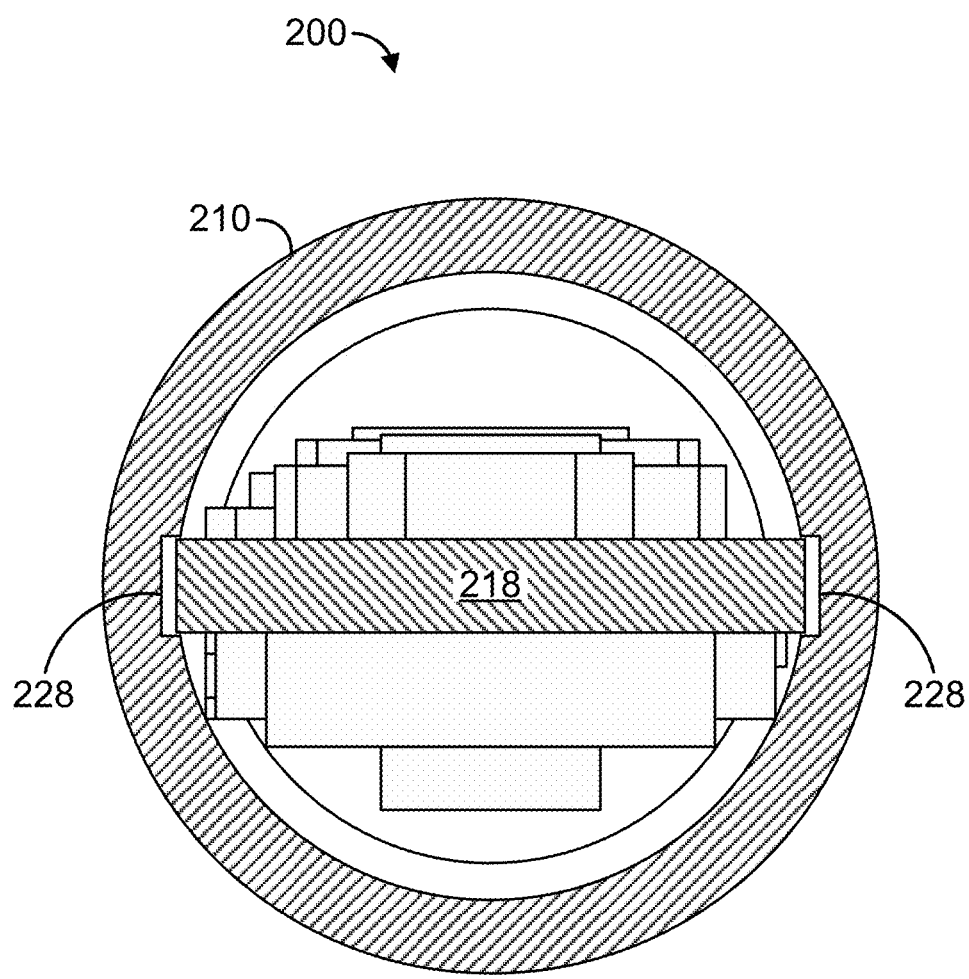
FIG. 2C is a cross-section view illustration of the example arrow nock system.

FIG. 2C is a cross-section illustration of the example nock system 200, the cross section being taken along line A-A of FIG. 2A, that further illustrates how the computing system 204 can be arranged within the nock housing 202. As shown, the interior cavity of the shaft portion 210 of the nock housing 202 can include one or more notches 228. The computing system 204 can be arranged within the shaft portion 210 such that one or more edges of the substrate 218 of the computing system 204 align with and engage the one or more notches 228. This can help secure the computing system 204 within the nock housing 202 by preventing the computing system 204 from rotating with respect to the nock housing 202.

Referring back to FIG. 2B, the electronic devices 216 of the computing system 204 can include a controller, an accelerometer, a transmitter, a light source, and/or a sound-emitting device.

The controller can include one or more computing devices. For example, the controller can include a microprocessor, an application-specific integrated circuit (ASIC), a field-programmable gate array (FPGA), or the like. The controller can be connected to the various other electronic devices, including the accelerometer, the transmitter, the light source, and/or the sound-emitting device via one or more connection mechanisms.

The accelerometer can include any device configured to output an electrical signal to the controller based on a mechanical motion of the nock system 200. For instance, in some examples, the accelerometer can include a shock or vibration sensor configured to output a particular electrical signal when exposed to a threshold high impact force. In other examples, the accelerometer can be a commercially available IC configured to use piezoelectric, piezoresistive, or capacitive components to convert mechanical motion of the nock system 200 into an electrical signal.

Further, the accelerometer can be part of an inertial measurement unit (IMU) configured to use one or more gyroscopes in combination with one or more accelerometers to measure various motion characteristics, such as a linear acceleration and an angular velocity, of the nock system 200.

The transmitter can include an antenna for transmitting radio frequency (RF) signals. The transmitter can be configured to transmit RF signals according to a particular wireless protocol, such as Bluetooth, Bluetooth Low Energy (BLE), or Wi-Fi, to name a few. In some examples, the transmitter can be part of a transceiver that includes a receiver for receiving RF signals.

The light source can take various forms, such as an LED or a laser diode. In some examples, the light source can be arranged near an end of the substrate 218 of the computing system 204 such that the light source is disposed within the nock portion 208 of the nock housing 202. In this manner, when the nock housing 202 is inserted into an arrow shaft, light emitted by the light source can radiate through the nock portion 208 of the nock housing 202. In order to increase the visibility of this radiated light, at least the nock portion 208 of the nock housing 202 can be made of a transparent or translucent material, such as various types of plastic.

The sound-emitting device can take various forms and can include a speaker or a buzzer, such as an electromechanical or a piezoelectric buzzer.

The battery 206 can include one or more batteries capable of being arranged within or on an arrow. As shown, the battery 206 can be a cylindrical pin type battery with a diameter that is smaller than the inner diameter of the shaft portion 210 of the nock housing 202, such that the battery 206 can be inserted at least partially into the nock housing 202. The battery 206 can include an anode terminal 220 and a cathode terminal 222 that interface with battery contacts 224 of the computing system 204 in order to power the various electronic components of the computing system 204. As further shown, the battery 206 can include an O-ring 226 encircling the battery 206. The O-ring 226 can engage an inner surface of the shaft portion 210 of the nock housing 202, thereby causing the battery 206 to snugly fit within the shaft portion 210 and preventing the battery 206 from decoupling from the battery contacts 224 of the computing system 204.

FIGS. 3A, 3B, and 3C are illustrations of other example arrow nock systems 310, 320, 330 for use in connection with an arrow. Each of the example arrow nock systems in FIGS. 3A, 3B, and 3C are illustrated to show a few possible variations to the example arrow nock system 200 depicted in FIGS. 2A, 2B, and 2C.

Referring to FIG. 3A, the example arrow nock system 310 includes a button 312 that can be connected to one or more electrical components of the computing system 204. In some examples, the button 312 can be used to activate or deactivate one or more of the electrical components. For instance, pressing the button 312 can complete or interrupt an electrical circuit, thereby turning on or turning off the transmitter, the light source, and/or the sound-emitting device. In other examples, the button 312 can be used to arm one or more of the electrical components. For instance, the controller can be configured to detect whether the button 312 has been pressed and may only carry out the various operations described herein upon detecting that the button 312 has been pressed.

As further shown, the example arrow nock system 310 can include a battery retainer 314 that helps secure the battery within the nock housing. The battery retainer 314 can extend along a length of the battery and wrap around a distal end of the battery. The battery retainer 314 can exert a force on the distal end of the battery that presses the battery against the battery contacts of the computing system. In some examples, the battery retainer 314 can include one of the battery contacts (e.g., the cathode battery contact) of the computing system.

Referring to FIG. 3B, the example arrow nock system 320 includes a nock portion 322 that is configured to engage a bow string of a crossbow. As such, the example arrow nock 320 can be used in connection with a crossbow bolt.

Referring to FIG. 3C, the example arrow nock system 330 includes a first shaft portion 332 and a second shaft portion 334. Similar to the shaft portion 210 of the example nock system 200 in FIG. 2, the first shaft portion 332 can have a diameter that is smaller than an inner diameter of an arrow shaft, such that the first shaft portion 332 can fit snugly within the arrow shaft. The second shaft portion 334, on the other hand, can have a diameter that is larger than the inner diameter of the arrow shaft, such that the second shaft portion 334 remains exposed from the arrow shaft when the example nock system 330 is coupled to the arrow. This larger second shaft portion 334 can be used to accommodate components of the computing system 204 which can be advantageously exposed from the arrow shaft (e.g., for larger components that do not fit within the arrow shaft or for components that work more effectively when exposed from the arrow shaft).

C. Remote Computing Device

Figure 4:
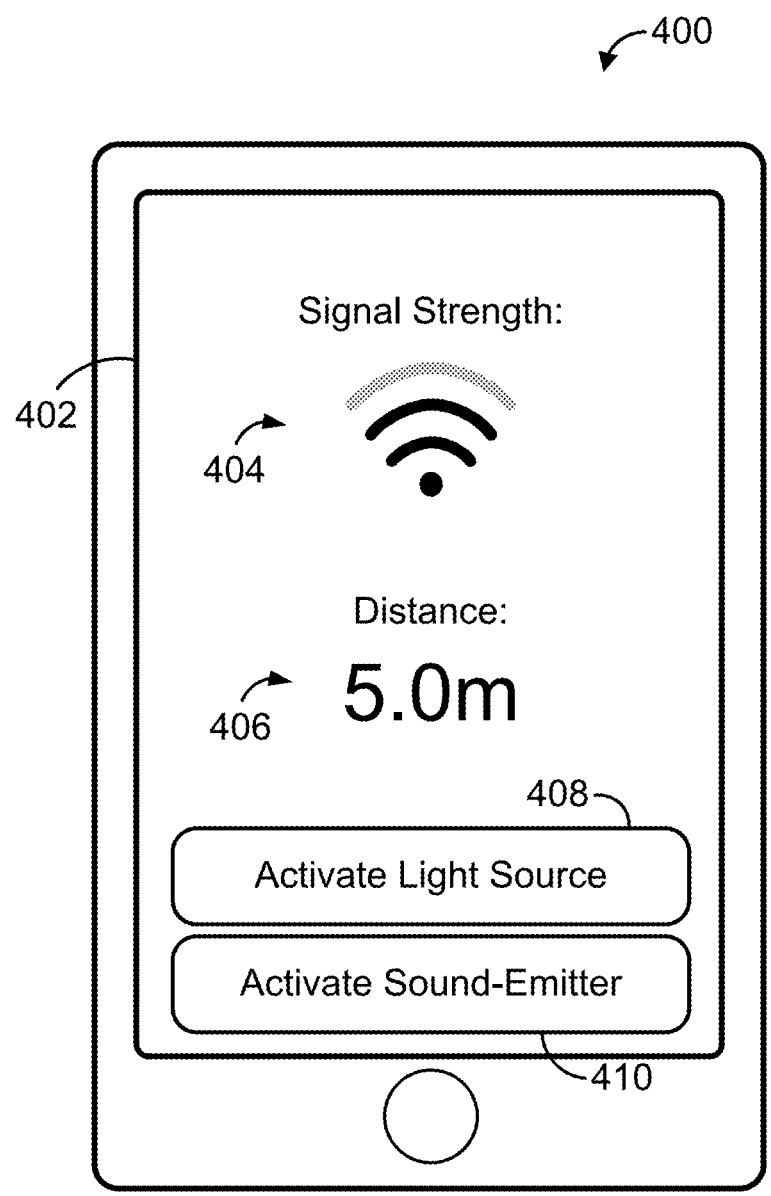
FIG. 4 is a simplified illustration of an example remote computing device.

FIG. 4 illustrates a simplified diagram of a remote computing device 400. The remote computing device 400 can include some or all of the components of the computing device 100 depicted in FIG. 1 and can take various forms, such as a mobile phone, a tablet, a laptop, a desktop computer, or the like.

The remote computing device 400 can be mechanically uncoupled to the arrow nock system 200, but can include a communication interface for engaging in wireless communication with the arrow nock system 200. For example, the remote computing device can wirelessly receive signals from and/or transmit signals to the arrow nock system 200.

Further, the remote computing device 400 can include a user interface 402 for displaying various data related to the arrow nock system 200. As shown, the user interface 402 can display an indication of a signal strength 404 of the wirelessly received signals and/or an indication of a distance 406 of the remote computing device 400 from the arrow nock system 200. As further shown, the user interface 402 can include a light source button 408 for manually activating the light source of the arrow nock system 200 and a sound-emitter button 410 for manually activating the sound-emitting device of the arrow nock system 200.

III. Example Operations

The arrow nock system 200 and the remote computing device 400, and/or components thereof, can perform various acts and/or functions. These features and related features will now be described.

The arrow nock system 200 and the remote computing device 400 can perform various acts and/or functions for locating an arrow that has been shot from a bow. In line with the discussion above, the arrow nock system 200 can be coupled to an arrow by inserting the shaft portion 210 of the nock housing 202 into a shaft of the arrow. The computing system 204 of the arrow nock system 200 can then determine when the arrow has been shot from a bow.

As noted above, the arrow nock system 200 can include an accelerometer or a shock sensor that can convert mechanical motion of the arrow to an electrical signal. The electrical signal output by the accelerometer or shock sensor can be provided to the controller of the computing system 204, and, based on the electrical signal output by the accelerometer, the controller can determine that the arrow has been shot. For instance, the controller can determine that the electrical signal output by the accelerometer is indicative of the arrow nock system 200 experiencing a threshold high acceleration or deceleration that can occur when the arrow is shot from a bow or when the arrow strikes a target. Based on the electrical signal indicating the threshold high acceleration or deceleration, the controller can determine that the arrow has been shot from a bow.

Once the controller determines that the arrow has been shot from a bow, the controller can responsively operate various components of the computing system 204 in order to help allow the arrow to be located. For instance, the controller can responsively cause the transmitter of the computing system 204 to repeatedly transmit a beacon signal for reception by the remote computing device 400.

Upon receiving the beacon signal, the remote computing device 400 can determine a proximity of the remote computing device 400 relative to the arrow nock system 200. For example, the remote computing device 400 can determine a signal strength of the received beacon signal, and the remote computing device 400 can display a visual representation of the signal strength 404 via its user interface 402. In this manner, a user can determine that the remote computing device 400 is getting closer to the arrow nock system 200 as the indicated signal strength 404 increases and that the remote computing device 400 is getting farther away from the arrow nock system 200 as the indicated signal strength 404 decreases.

Additionally or alternatively, the remote computing device 400 can estimate a distance between the remote computing device 400 and the arrow nock system 200 and display the estimated distance 406 via its user interface 402. The remote computing device 400 can estimate this distance 406 based on the detected signal strength of the beacon signal, for instance. Other distance measurement techniques, such as phase shift measurements or time of flight measurements, can be employed as well.

The controller can further activate the light source and/or the sound-emitting device of the computing system 204 responsive to determining that the arrow has been shot from a bow. By causing the arrow nock system 200 to emit light and sound, the arrow can be more readily located after being shot from the bow.

In practice, the controller can cause the transmitter to pulse the beacon signal at a particular rate, and the controller can likewise cause the light source and the sound-emitting device to pulse their light and sound outputs at respective rates. Further, the controller can vary these rates based on an amount of time that has elapsed since the arrow was shot from the bow.

In particular, the controller can cause the transmitter to transmit the beacon signal at a variable rate that is inversely related to the amount elapsed time after the arrow is shot from the bow. As an example, once the controller determines that the arrow has been shot from the bow, the controller can cause the transmitter to transmit the beacon signal at an initial rate (e.g., once per second). At a subsequent time, the controller can cause the transmitter to transmit the beacon signal at a subsequent rate (e.g., once every ten seconds) that is lower than the initial rate. In some examples, the controller can adjust the transmission rate of the beacon signal continuously as time elapses, or the controller can adjust the transmission rate in a stepwise fashion as time elapses.

Figure 5:
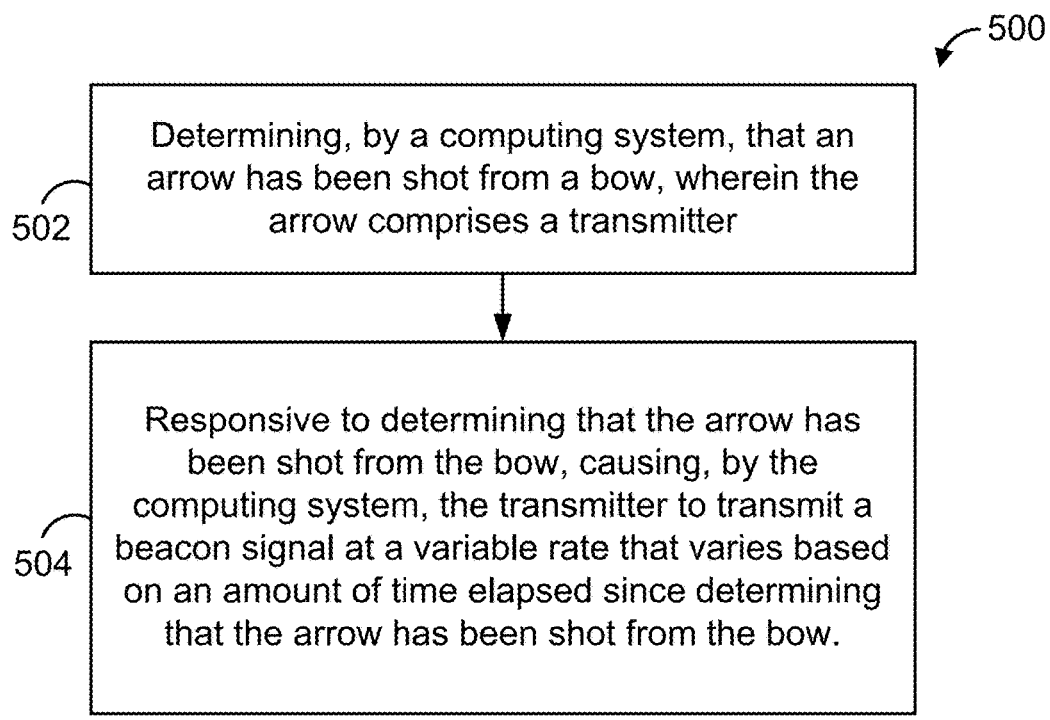
FIG. 5 is a flow chart of an example method.

Accordingly, FIG. 5 illustrates a flow chart of an example method 500 in line with this disclosure. At block 502, the method 500 can include determining, by a computing system, that an arrow has been shot from a bow, wherein the arrow comprises a transmitter. And at block 504, the method 500 can include responsive to determining that the arrow has been shot from the bow, causing, by the computing system, the transmitter to transmit a beacon signal at a variable rate that varies based on an amount of time elapsed since determining that the arrow has been shot from the bow.

The controller can also cause the light source and/or the sound-emitting device to respectively output light and/or sound at a variable rate that is inversely related to the amount elapsed time after the arrow is shot from the bow. For instance, the controller can adjust a duty cycle of an activation signal supplied to the light source and/or the sound-emitting device based on the amount of elapsed time after determining that the arrow has been shot from the bow. As the elapsed time increases, the controller can decrease the duty cycle, either continuously or in a stepwise fashion.

In examples where the arrow nock system 200 includes a transceiver that can receive signals from the remote computing device, the controller can activate the light source and/or the sound-emitting device in response to receiving a command from the remote computing device 400 (e.g., instead of or in addition to activating the light source and/or the sound-emitting device in response to detecting that the arrow has been shot from a bow). For example, a user can press the light source button 408 or the sound-emitter button 410, and the remote computing device 400 can send a signal to the transceiver of the arrow nock system 200 indicating the user input. The controller can detect the received signal and responsively activate the light source and/or the sound-emitting device.

Similarly, in other examples, a user can manually activate some or all of the transmitter, the light source, and/or the sound-emitting device before shooting the arrow from a bow. As described above with respect to FIG. 3A, for instance, the arrow nock system 310 can include a button 312 coupled to the transmitter, the light source, and/or the sound-emitting device, such that a user can activate these components by pressing the button 312.

Further, in some examples, the controller can be configured to activate the light source and/or the sound emitting device based on a proximity of the remote computing device 400 to the arrow nock system 200. For instance, the remote computing device 400 can transmit a signal to the arrow nock system 200 indicating a distance between the remote computing device 400 and the arrow nock system 200. If the indicated distance is below a threshold value, then the controller can responsively activate the light source and/or the sound-emitting device. As another example, the remote computing device 400 can determine that a distance between the remote computing device 400 and the arrow nock system 200 is below a threshold value and responsively transmit a signal to the arrow nock system 200 instructing the controller to activate the light source and/or the sound-emitting device.

Additionally, as noted above, the controller can be configured to only perform various functions described herein once the controller has been armed. The controller can be armed in various ways. In some examples, the controller can be armed by pressing a button (e.g., button 312 in FIG. 3A) disposed on the arrow nock system 310 or responsive to detecting an input via the user interface 402 of the remote computing device 400. In other examples, the controller can be armed using near-field communication (NFC) techniques. For instance, the arrow nock system 200 and the remote computing device 400 can include NFC-enabled devices, such that the arrow nock system 200 can arm the controller based on a proximity of the remote computing device 400 to the arrow nock system 200. In particular, the arrow nock system 200 can arm the controller responsive to determining that a distance between the arrow nock system 200 and the remote computing device 400 falls below a threshold distance. In some examples, this threshold distance can be particularly small (e.g., on the order of a few centimeters) such that a user may need to bring the arrow nock system 200 and the remote computing device 400 into contact or near contact.

As further noted above, the accelerometer of the arrow nock system 200 can be part of an IMU configured to measure various motion characteristics of the arrow nock system 200. The IMU can be configured to measure a linear acceleration and an angular velocity of the arrow nock system 200 at any given time. In some examples, the controller can cause the IMU to measure motion data responsive to determining that the arrow has been shot from a bow. The controller can then receive this motion data from the IMU and determine various flight characteristics of the arrow, such as time of flight, velocity, distance, flight path, or impact force, to name a few. The controller can cause the transmitter to transmit this motion data to the remote computing device 400, and the remote computing device 400 can display the motion data via the user interface 402.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more example of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for use in connection with an arrow comprising a controller and a transmitter, the method comprising:
responsive to positioning the controller within a threshold distance from a computing device, causing the controller to transition from a deactivated state to an activated state;
wherein, in the activated state, the controller is configured to: (i) determine whether the arrow has been shot from a bow, and (ii) upon determining that the arrow has been shot from the bow, cause the transmitter to transmit the beacon signal at a variable rate that varies based on an amount of time elapsed since determining that the arrow has been shot from the bow comprising: causing the transmitter to transmit the beacon signal at a first rate at a first time, causing the transmitter to transmit the beacon at a second rate at second time, and causing the transmitter to transmit the beacon at a third rate at a third time, wherein the third rate is lower than the second rate, and the second rate is lower than the first rate, and wherein the third time is later than the second time, and the second time is later than the first time; and
wherein, in the deactivated state, the controller is configured to refrain from determining whether the arrow has been shot from the bow, such that the controller refrains from transmitting the beacon signal when shooting the arrowing while the controller is in the deactivated state.

2. A method for use in connection with an arrow comprising a controller and a
transmitter, the method comprising:
responsive to positioning the controller within a threshold distance from a computing device, causing the controller to transition from a deactivated state to an activated state;
wherein, in the activated state, the controller is configured to: (i) determine whether the arrow has been shot from a bow, and (ii) upon determining that the arrow has been shot from the bow, cause the transmitter to transmit a beacon signal at a variable rate that varies based on an amount of time elapsed since determining that the arrow has been shot from the bow comprising:
causing the transmitter to transmit the beacon signal at a first rate at a first time, causing the transmitter to transmit the beacon at a second rate at second time, and causing the transmitter to transmit the beacon at a third rate at a third time, wherein the third rate is lower than the second rate, and the second rate is lower than the first rate, and wherein the third time is later than the second time, and the second time is later than the first time, including adjusting the transmission rate of the beacon signal continuously as time elapses; and wherein, in the deactivated state, the controller is configured to refrain from determining whether the arrow has been shot from the bow, such that the controller refrains from transmitting the beacon signal when shooting the arrowing while the controller is in the deactivated state.

3. The method of claim 2, wherein the variable rate is inversely related to the amount of elapsed time.

4. The method of claim 2, wherein the arrow further comprises an accelerometer or a shock sensor, and wherein determining, by the controller in the activated state, whether the arrow has been shot from the bow comprises determining that whether the arrow has been shot from the bow based on a signal output by the accelerometer or the shock sensor.

5. The method of claim 2, wherein the computing device is a remote computing device that is uncoupled to the arrow, and wherein the method further comprises:
   receiving, by the remote computing device, the transmitted beacon signal; and
   displaying, via an interface of the remote computing device, an indication of a location of the arrow based on the received beacon signal.

6. The method of claim 2, wherein the arrow further comprises a light source, and wherein, in the activated state, the controller is further configured to adjust a duty cycle of the light source based on the amount of elapsed time.

7. The method of claim 2, wherein the arrow further comprises a sound-emitting device, and wherein, in the activated state, the controller is further configured to adjust a duty cycle of the sound-emitting device based on the amount of elapsed time.

8. The method claim 2, wherein the arrow further comprises a light source, and wherein, in the activated state, the controller is further configured, to after determining that the arrow has been shot from the bow, activate the light source based on a proximity of the computing device arrow.

9. The method of claim 5, wherein the arrow further comprises at least one of a light source or a sound-emitting device, and wherein the method further comprises activating, by the controller, the at least one light source or sound-emitting device based on an input received via the interface of the remote computing device.

10. The method of claim 2, wherein the arrow further comprises a sound-emitting device, and wherein, in the activated state, the controller is further configured to, after determining that the arrow has been shot from the bow, activate the sound-emitting device based on a proximity of the computing device to the arrow.

11. A system for use in connection with an arrow, the system comprising:
   an arrow nock configured to couple to the arrow;
   a transmitter coupled to the arrow nock; and
   a controller configured to transition from a deactivated state to an activated state responsive to the controller being positioned within a threshold distance from a computing device;
   wherein, in the activated state, the controller is configured to: (i) determine whether the arrow has been shot from a bow and (ii) upon determining that the arrow has been shot from the bow, cause the transmitter to transmit a beacon signal at a variable rate that varies continuously based on an amount of time elapsed since determining that the arrow has been shot from the bow comprising:
   causing the transmitter to transmit the beacon signal at a first rate at a first time, causing the transmitter to transmit the beacon at a second rate at second time, and causing the transmitter to transmit the beacon at a third rate at a third time, wherein the third rate is lower than the second rate, and the second rate is lower than the first rate, and wherein the third time is later than the second time, and the second time is later than the first time, and wherein, in the deactivated state, the controller is configured to retrain from determining whether the arrow has been shot from the bow, such that the controller refrains from transmitting the beacon signal when shooting the arrow while the controller is in the deactivated state.

12. The system of claim 11, wherein the variable rate is inversely related to the amount of elapsed time.

13. The system of claim 11, further comprising an accelerometer or a shock sensor, wherein, in the activated state, the controller is configured to determine whether the arrow has been shot from the bow based on a signal output by the accelerometer or the shock sensor.

14. The system of claim 11, wherein the computing device is remote from the arrow nock, and wherein the remote computing device is configured to: (i) receive the transmitted beacon signal and (ii) display, via an interface of the remote computing device, an indication of a location of the arrow based on the received beacon signal.

15. The system of claim 11, further comprising at least one of a light source or a sound-emitting device coupled to the arrow nock, wherein, in the activated state, the controller is further configured to activate the at least one light source or sound-emitting device responsive to determining that the arrow has been shot from the bow.

16. The system of claim 11, further comprising at least one of a light source or a sound-emitting device coupled to the arrow nock, wherein, in the activated state, the controller is further configured to adjust a duty cycle of the at least one light source or sound-emitting device based on the amount of elapsed time after determining that the arrow has been shot from the bow.

17. The system of claim 11, further comprising at least one of a light source or a sound-emitting device coupled to the arrow nock, wherein, in the activated state, the controller is further configured to, after determining that the arrow has been shot from the bow, activate the at least one light source or sound-emitting device based on a proximity of the computing device to the arrow nock.

18. The system of claim 14, further comprising at least one of a light source or a sound-emitting device coupled to the arrow nock, wherein the controller is further configured to activate the at least one light source or sound-emitting device based on an input received via the interface of the remote computing device.

19. A system for use in connection with an arrow, the system comprising:
   an arrow nock configured to couple to the arrow;
   a transmitter coupled to the arrow nock; and
   a controller configured to transition from a deactivated state to an activated state responsive to the controller being positioned within a threshold distance from a computing device;
   wherein, in the activated state, the controller is configured to: (i) determine whether the arrow has been shot from a bow and (ii) upon determining that the arrow has been shot from the bow, cause the transmitter to transmit a beacon signal at a variable rate that varies continuously based on an amount of time elapsed since determining that the arrow has been shot from the bow, wherein the variable rate is a first rate at a first time, wherein the variable rate is a second rate at a second time, and wherein the second rate is lower than the first rate and the second time is later than the first time, and wherein, in the deactivated state, the controller is configured to refrain from determining whether the arrow has been shot from the bow, such that the controller refrains from transitioning the beacon signal when shooting the arrow while the controller is in the deactivated state.

\* \* \* \* \*